US008205996B2

(12) United States Patent
Combs

(10) Patent No.: US 8,205,996 B2
(45) Date of Patent: Jun. 26, 2012

(54) SYSTEM FOR LIGHT SWITCH IDENTIFICATION

(76) Inventor: Jeffrey S. Combs, Indianapolis, IN (US)

( * ) Notice: Subject to any disclaimer, the term of this patent is extended or adjusted under 35 U.S.C. 154(b) by 355 days.

(21) Appl. No.: 12/580,693

(22) Filed: Oct. 16, 2009

(65) Prior Publication Data

US 2010/0097781 A1 Apr. 22, 2010

Related U.S. Application Data

(60) Provisional application No. 61/106,006, filed on Oct. 16, 2008.

(51) Int. Cl.
*G01D 11/28* (2006.01)

(52) U.S. Cl. ................ 362/23; 362/24; 362/25; 362/26; 362/27; 362/28; 362/29; 362/30

(58) Field of Classification Search ............... 362/23–30
See application file for complete search history.

(56) References Cited

U.S. PATENT DOCUMENTS

| | | | | |
|---|---|---|---|---|
| 7,394,367 | B1 * | 7/2008 | Aupperle et al. | 340/540 |
| 2005/0207136 | A1 * | 9/2005 | Jasper | 362/26 |
| 2009/0020307 | A1 * | 1/2009 | Roach, Jr. | 174/66 |
| 2010/0058638 | A1 * | 3/2010 | Askin et al. | 40/661 |

* cited by examiner

*Primary Examiner* — William Carter
(74) *Attorney, Agent, or Firm* — Ice Miller LLP

(57) ABSTRACT

A light switch cover having a light switch identifier to identify light coupled to a particular light switch. To this end, the light switch identifier may be positioned adjacent the light switch and/or a designation (number, letter or both) may be established for the light switch identifier and the light switch. The light switch cover may include a small clear cover behind which a label is positioned which identifies the particular light (or other device) that the corresponding light switch is operable to control.

19 Claims, 3 Drawing Sheets

SYSTEM FOR LIGHT SWITCH IDENTIFICATION

CROSS REFERENCE TO RELATED APPLICATION

This application claims the benefit of U.S. Provisional Application Ser. No. 61/106,006, filed Oct. 16, 2008.

FIELD OF THE INVENTION

The present disclosure generally relates to light switch identification, and more specifically, to light switch identifiers incorporated into light switch covers.

BACKGROUND OF THE INVENTION

Buildings and residential homes often have numerous light switches operable to direct the illumination of numerous different lights. In many cases, light switches for different lights are positioned together in the same area and incorporated into the same light switch cover. Many people realize the frustration of turning different lights on and off before reaching the intended light. In some situations, it takes at least two people to determine which light switch operates which light—one person flipping the light switches and another person at a remote location observing the lights. Even when an individual properly associates the light switches with the particular lights, this information can be easily forgotten.

A need exists for identification systems for light switches.

DESCRIPTION OF THE ILLUSTRATED EMBODIMENTS

Figure 1:
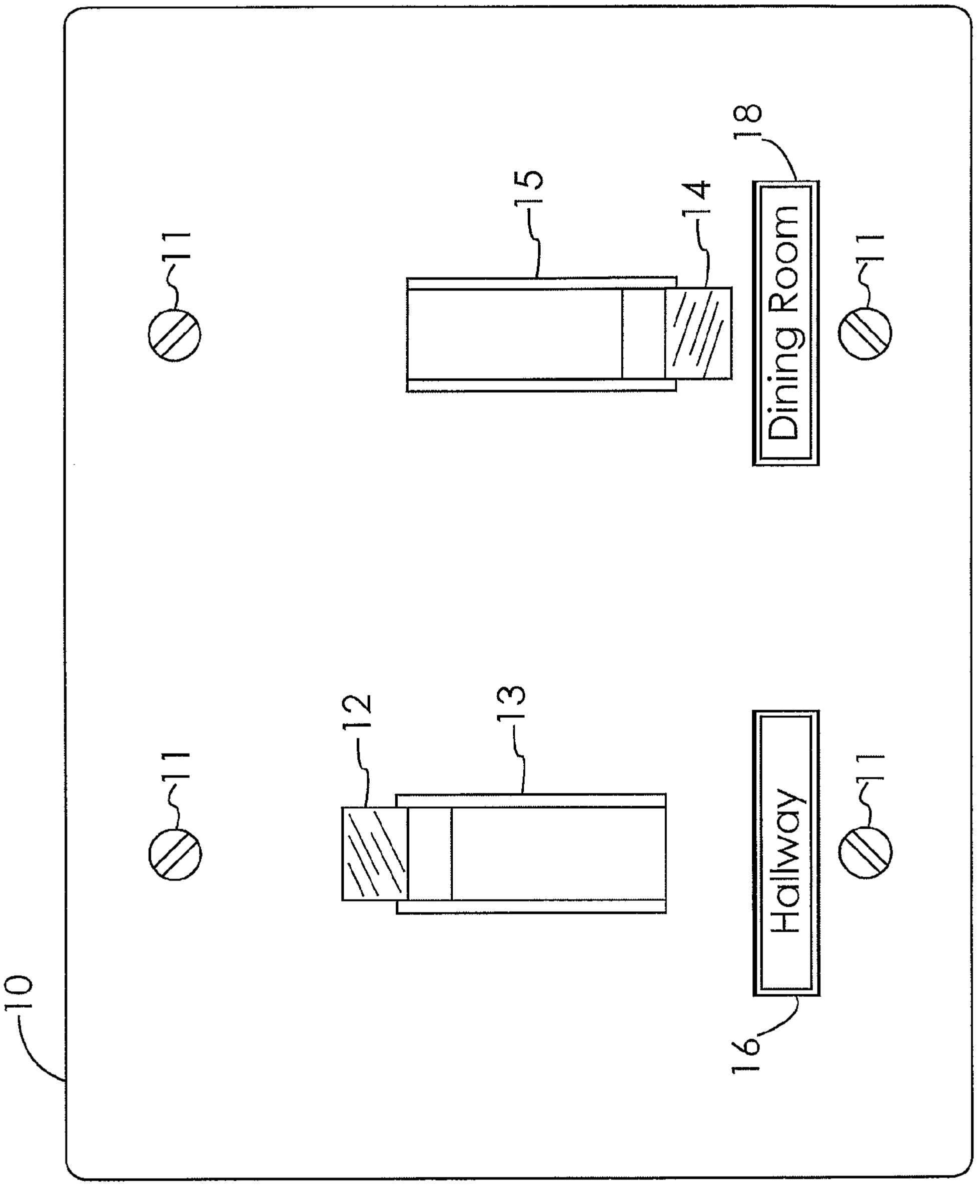
FIG. 1 is a front view of light switch cover having light switch identifiers according to an embodiment of the present disclosure.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, such alterations and further modifications in the illustrated device, and such further applications of the principles of the disclosure as illustrated therein are contemplated as would normally occur to one skilled in the art to which the disclosure relates.

The present disclosure is generally directed to light switch covers having light switch identifiers to identify the light coupled to a particular light switch. In certain embodiments, the light switch cover may include a small clear cover behind which a label is positioned which identifies the particular light (or other device) that the corresponding light switch is operable to control.

FIG. 1 illustrates an example embodiment of a light switch cover 10 having light switch identifiers 16 and 18. In the illustrated embodiment, identifier 16 identifies the light (or other device) which light switch 12 is operable to control and identifier 18 identifies the light (or other device) which light switch 14 is operable to control. As illustrated, the light switch identifiers may be positioned directly underneath the corresponding light switches. However, it should be appreciated that in other embodiments, the light switch identifiers may be positioned at other locations on the light switch cover so long as it is relatively easy to recognize the association between the light switch identifier and the corresponding light switch. As examples, the light switch identifiers can be positioned directly above or to the side of the corresponding light switches. As an alternative example, the light switches may each include a number or letter designation, with the light switch identifiers being positioned remote from the light switches and each being given the same letter or number designation as the light switch for which they identify. In the particular illustrated example, light switch 12 is operable to control a hallway light and light switch 14 is operable to control a dining room light.

Light switch cover 10 defines holes 13 and 15 through which light switches 12 and 14, respectively, are positioned. In the illustrated embodiment, light switches 12 and 14 are typical toggle light switches. However, it should be appreciated that the light switches used in conjunction with the light switch identifiers of the present disclosure may be of a different design. As examples, one or both of the light switches can be a dimmer switch, a push-button switch, a rocker switch, a mercury switch, an electronic switch, a 3-way switch, and/or a 4-way switch. The light switch cover according to the present disclosure may be a typical switch plate cover found in many buildings and residential homes. The light switch cover may be composed of a plastic, ceramic or metal material, and serves to prevent accidental contact with live terminals of the light switches. The light switch cover may be designed in a variety of different styles and colors. As illustrated, one or more screws 11 may be used to mount the light switch cover. However, it should be appreciated that the light switch cover may be mounted in various other manners as would generally occur to one skilled in the art.

The light switch identifiers contemplated by the present disclosure may be configured in a variety of possible ways as would generally occur to one skilled in the art. Example configurations are illustrated in FIGS. 2 and 3.

Figure 2:
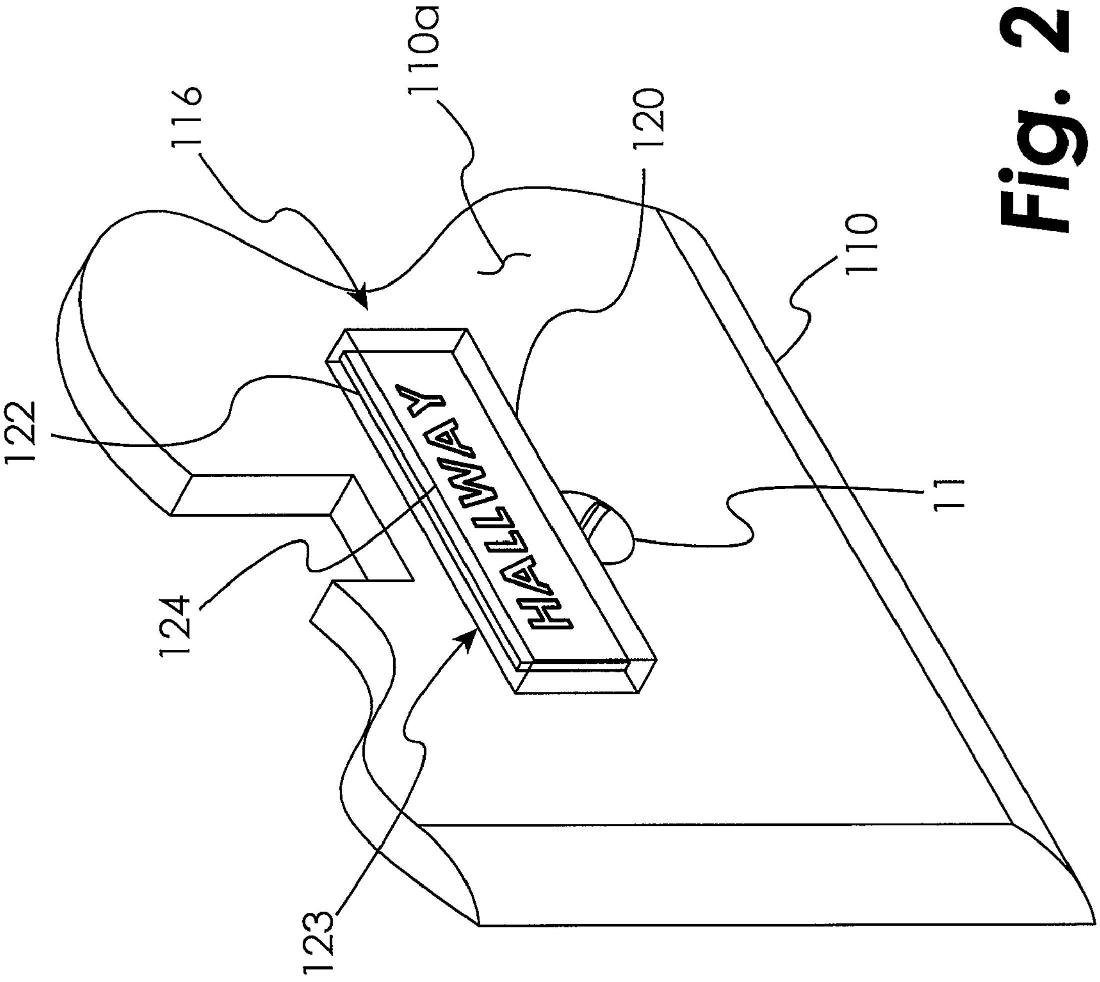
FIG. 2 is a perspective view of a portion of a light switch cover with a light switch identifier according to an embodiment of the present disclosure.
Figure 3:
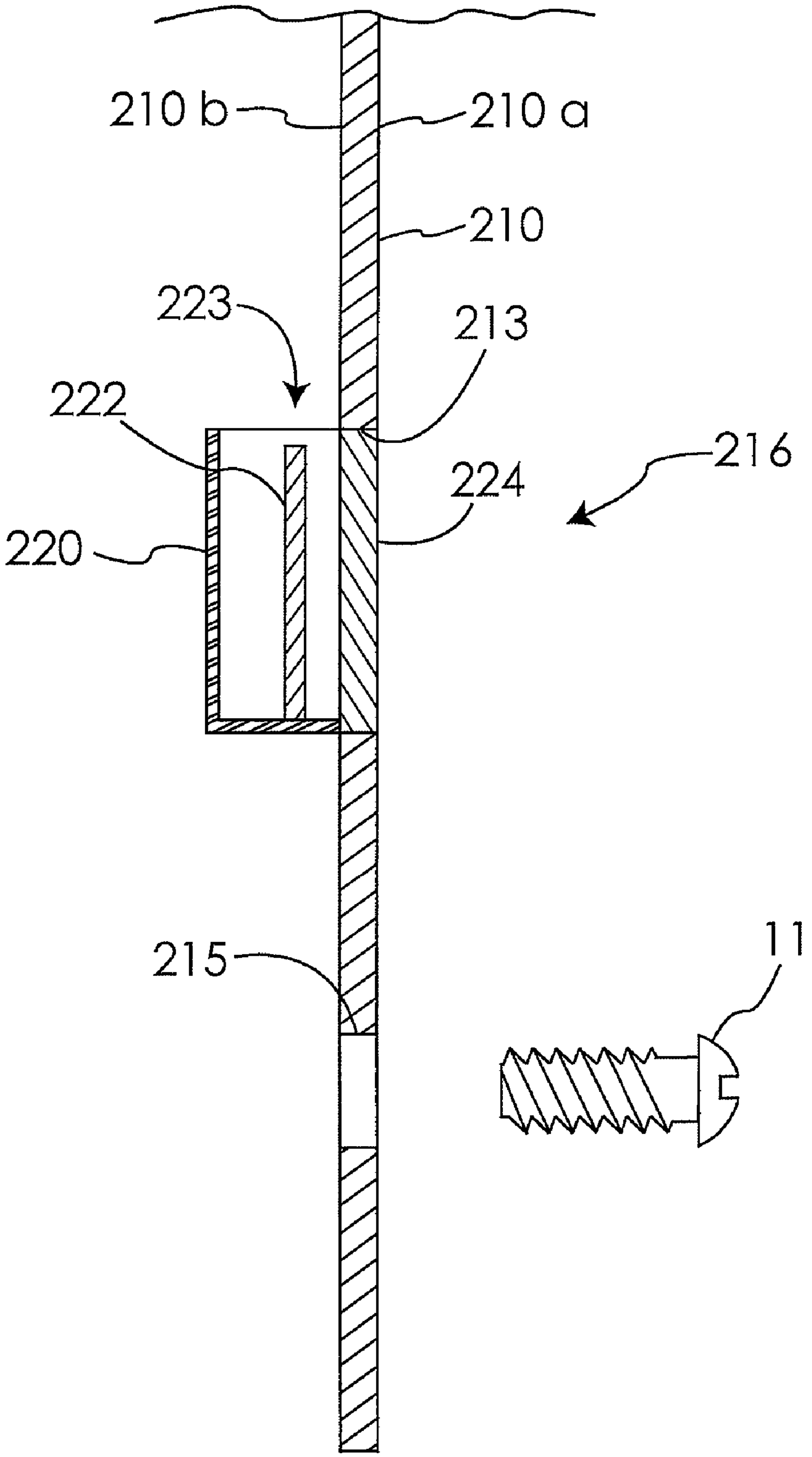
FIG. 3 is a side, partial cross-sectional view of a portion of a light switch cover with a light switch identifier according to an embodiment of the present disclosure.

In the example illustrated in FIG. 2, light switch cover 110 includes a light switch identifier 116 generally comprising a receptacle 120 positioned on a front surface 110*a* of the light switch cover. Receptacle 120 includes a clear front piece 124 and defines a top opening 123 for the insertion and removal of a label identifying the corresponding light switch. In certain embodiments, the bottom and side surfaces or pieces may also be clear, or they may be translucent or opaque. Front piece 124 is sufficiently clear to enable an individual to read the label positioned within receptacle 120. In the illustrated example, label 122 includes the word "hallway" to identify that the corresponding light switch is operable to turn the hallway light off and on.

The configuration of receptacle 120 extending from front surface 110*a* of light switch cover 110 allows for a user to insert labels into the receptacle as desired without removing the light switch cover from the light switch and/or the wall surface. In certain embodiments, receptacle 120 is a discrete or unitary piece which may be positioned on and/or mounted to front surface 110*a* in any appropriate manner as would generally occur to one skilled in the art. As an example, the receptacle may be mounted to the front surface of the cover via fasteners, such as nails or screws. In other embodiments, one or more pieces of the receptacle may be integral with the light switch cover.

Although the receptacle illustrated in FIG. 2 includes an opening at the top, it should be appreciated that in lieu of or in addition to the top opening, one or both of the sides of the receptacle may be open so that the label can be inserted in and out of the receptacle from the side. Additionally, in some embodiments, the receptacle may include a removable cover configured to fit over the opening(s) when desired.

In the example illustrated in FIG. 3, light switch cover 210 includes a light switch identifier 216 generally comprising a receptacle 220 positioned within a hole 213 defined in the light switch cover, being accessible from the back of the light switch cover and substantially flush with front surface 210*a*. Receptacle 220 includes a clear front piece 224 snugly positioned within hole 213 and defines a top opening 223 for the insertion and removal of a label 222 identifying the corresponding light switch. In certain embodiments, the bottom and side surfaces or pieces may also be clear, or they may be translucent or opaque. Front piece 224 is sufficiently clear to enable an individual to read the label positioned within receptacle 220.

The configuration of receptacle 220 extending beyond back surface 210*b* of light switch cover 210 provides protection to the identification label, reducing the potential of unintentional contact with the receptacle and/or the label positioned within the receptacle. To insert labels into the receptacle as desired, the user may temporarily remove or at least displace the light switch cover by at least partially unscrewing one or more screws 11 from holes 215 in the light switch cover to expose back surface 210*b* and thus opening 223 to the user. In certain embodiments, receptacle 220 is a discrete or unitary piece which may be positioned on and/or mounted to cover 210 in any appropriate manner as would generally occur to one skilled in the art, such as through the user of fasteners as an example. In other embodiments, one or more pieces of the receptacle may be integral with the light switch cover.

Although the receptacle illustrated in FIG. 3 includes an opening at the top, it should be appreciated that in lieu of or in addition to the top opening, one or both of the sides of the receptacle may be open so that the label can be inserted in and out of the receptacle from the side. Additionally, in some embodiments, the receptacle may include a removable cover configured to fit over the opening(s) when desired.

In certain embodiments, clear front pieces 124 and 224 may be composed of a plastic material, such as acrylic glass or polymethylmethacrylate (PMMA) as an example, often referred to as Plexiglas® material. In other embodiments, clear front pieces 124 and 224 may be composed of glass. It should be appreciated that the remaining pieces of the receptacles may be composed of any appropriate material(s) as would generally occur to one skilled in the art, including plastic materials as an example.

The light switch identifiers contemplated by the present disclosure, and/or the identifying labels used in accordance with the light switch identifiers, may be made from luminescent tape which can be charged by receiving light from a light source and will allow the identifying text to at least partially glow or be illuminated in low-light conditions.

Additionally, in certain embodiments, two or more light switch identifiers associated with electrical switches coupled to the same circuit may be configured to illuminate in the same color upon the occurrence of certain events. In a particular embodiment, each light switch identifier associated with the same circuit may include a colored lighting element which is operable to illuminate the light switch identifier when the circuit has been interrupted and/or when the breaker requires resetting, such that all the associated light switch identifiers are illuminated in the same color to assist in identifying the particular circuit or breaker. In some embodiments, the light switch identifiers which are configured to illuminate in the same color may be tied to the same ground fault interrupter circuit or breaker.

While the disclosure has been illustrated and described in detail in the drawings and foregoing description, the same is to be considered as illustrative and not restrictive in character, it being understood that only the preferred embodiments have been shown and described and that all changes and modifications that come within the spirit of the disclosure are desired to be protected.

What is claimed is:

1. A lighting system for identifying a light coupled to a light switch, comprising:
- a light switch cover at least partially covering the light switch; and
- a light switch identifier incorporated into the light switch cover, wherein the light switch identifier is associated with the light switch to identify the light switch as being coupled to the light;
- wherein the light switch identifier further includes a lighting element; and
- wherein the lighting element is operable to illuminate in response to at least one of an interruption in a circuit including the light and a requirement for a resetting of a breaker associated with the light.

2. The lighting system of claim 1, wherein the light switch identifier is positioned adjacent the light switch for associating the light switch identifier and the light switch.

3. The lighting system of claim 2, wherein the light switch identifier is positioned below the light switch.

4. The lighting system of claim 2, wherein the light switch identifier is positioned above the light switch.

5. The lighting system of claim 2, wherein the light switch identifier is positioned to a side of the light switch.

6. The lighting system of claim 1, wherein the light switch identifier and the light switch include a designation for associating the light switch identifier and the light switch.

7. The lighting system of claim 6, wherein the designation is a number.

8. The lighting system of claim 6, wherein the designation is a letter.

9. The lighting system of claim 1, wherein the light switch identifier includes:
- a receptacle positioned relative to a surface of the light switch cover; and
- a label supported by the receptacle, the label for identifying the light switch as being coupled to the light.

10. The lighting system of claim 9, wherein the receptacle has at least one piece mounted on the surface of the light switch cover.

11. The lighting system of claim 9, wherein the receptacle has at least one piece integrated with the surface of the light switch cover.

12. The lighting system of claim 9, wherein the receptacle is positioned within a hole defined in the light switch cover.

13. The lighting system of claim 9, wherein the receptacle includes:
- a clear front piece having an opening for inserting and removing the label.

14. The lighting system of claim 13, wherein the receptacle further includes:
- a cover removably configured to fit over the opening.

15. The lighting system of claim 13, wherein the clear front piece is at least partially composed of a plastic material.

16. The lighting system of claim 13, wherein the clear front piece is at least partially composed of a glass.

17. The lighting system of claim 1, wherein the light switch identifier is at least partially composed of a luminescent material.

18. The lighting system of claim 1, wherein the lighting element is colored.

19. A lighting system, comprising:

a light;

a light switch coupled to the light;

a light switch cover at least partially covering the light switch;

a light switch identifier incorporated into the light switch cover, wherein the light switch identifier is associated with the light switch to identify the light switch as being coupled to the light, and a light element incorporated into the light switch cover and operable to illuminate in response to at least one of an interruption in a circuit including the light and a requirement for a resetting of a breaker associated with the light.

* * * * *